United States Patent [19]

Roberts et al.

[11] Patent Number: 5,031,809
[45] Date of Patent: Jul. 16, 1991

[54] FISH STRINGER APPARATUS

[76] Inventors: Wendell J. Roberts, 301 Union St., Roseville, Calif. 95678; Thomas E. Fleenor, 8313 Villa View Dr., Citrus Heights, Calif. 95621

[21] Appl. No.: 514,450

[22] Filed: Apr. 25, 1990

[51] Int. Cl.$^5$ ............................................. A01K 65/00
[52] U.S. Cl. .................................................. 224/103
[58] Field of Search ......................................... 224/103

[56] References Cited
U.S. PATENT DOCUMENTS

| | | | |
|---|---|---|---|
| 2,518,541 | 2/1948 | Griffin et al. | 224/103 |
| 2,539,496 | 1/1951 | Towey | 224/103 |
| 2,760,700 | 8/1956 | Lien | 224/103 |
| 2,972,438 | 2/1961 | Kimbrough | 224/103 |
| 3,387,753 | 6/1968 | Bowman | 224/103 |
| 3,540,637 | 11/1970 | Ezell | 224/103 |

*Primary Examiner*—Henry J. Recla
*Assistant Examiner*—David J. Walczak
*Attorney, Agent, or Firm*—Henderson & Sturm

[57] ABSTRACT

A fish stringer apparatus (10) including a first elongated cable member (13) having one end (14) fixedly secured and the other end (15) releasably secured to a capture member (17) to form a separable stringer loop and, a second elongated cable member (30) secured on one end (32) to the capture member (17) and provided on its other end (34) with a rigid rod element (33) that will penetratingly engage the bank (301) of a body of water (300).

1 Claim, 1 Drawing Sheet

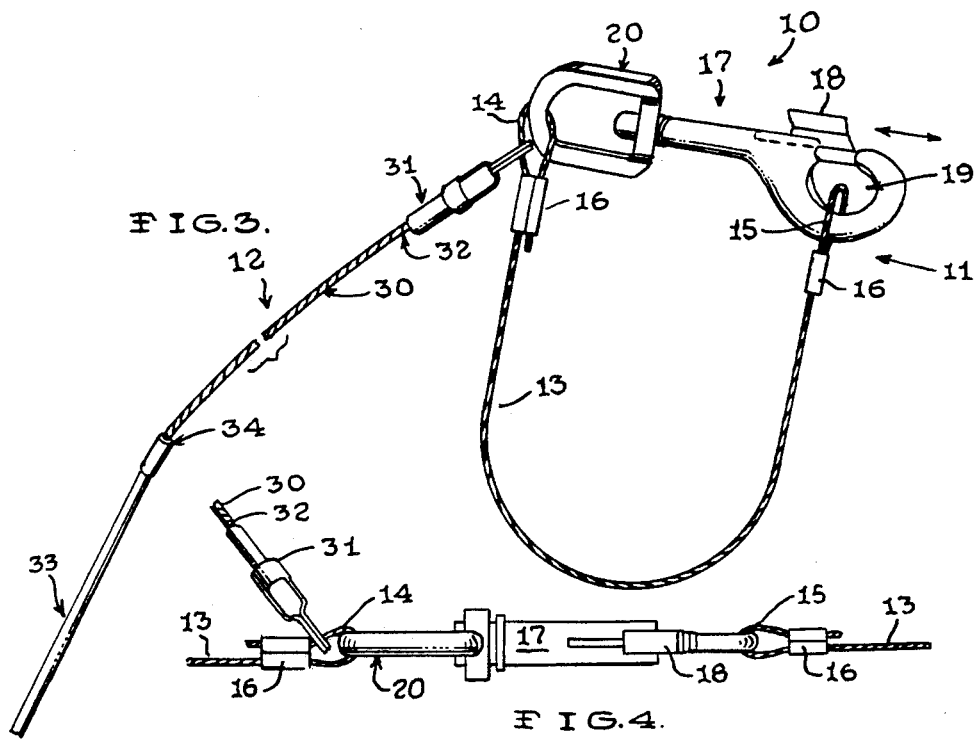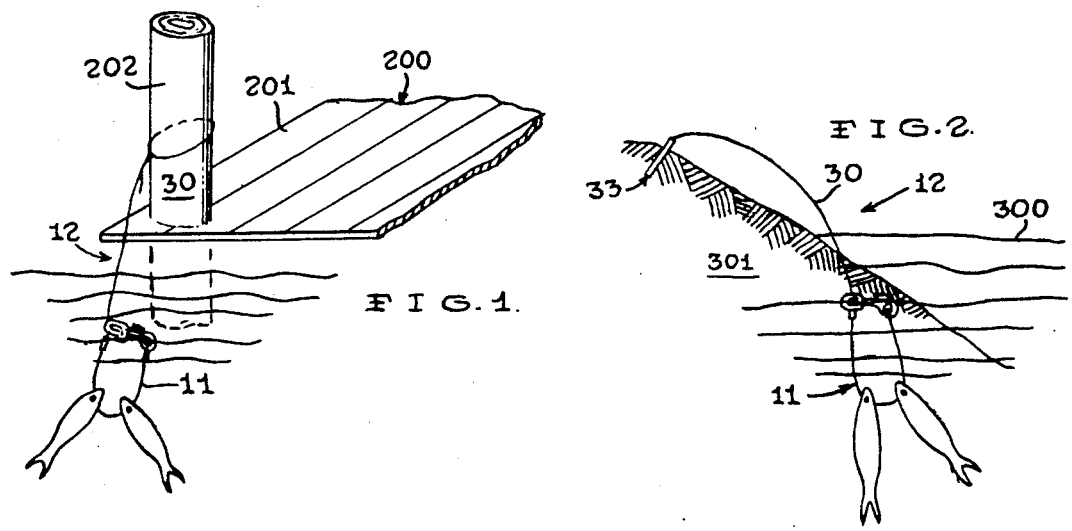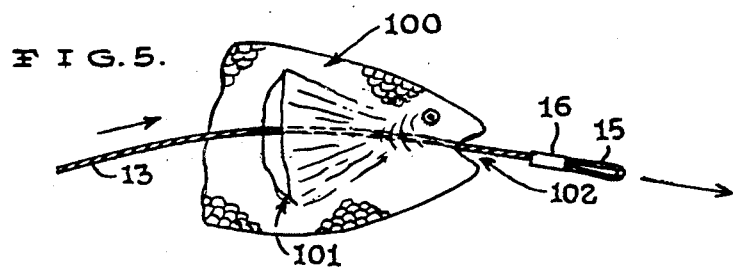

FISH STRINGER APPARATUS

TECHNICAL FIELD

The present invention relates to the field of fish stringer devices in general, and in particular to a fish stringer apparatus having a means for attaching the apparatus to another structure, or in the alternative, to penetratingly engaging the terrain in the vicinity of the fisherman.

BACKGROUND ART

As can be seen by reference to the following U.S. Pat. Nos. 2,760,700; 2,982,438; 3,387,753 and 3,540,637; the prior art is replete with myriad and diverse fish stringer devices.

While all of the aforementioned prior art constructions are more than adequate for the basic purpose and function for which they have been specifically designed, these prior art devices do not define the complete body of art in this particular area of technology and there is ample room for improvements and variations over the level of skill and expertise that has been exhibited to date.

In addition, as many people are aware, anglers are constantly looking for new and different techniques for accomplishing age old objectives and any device that can satisfy the criteria is almost assured of some level of commercial success.

As a consequence of the foregoing situation, there has existed a longstanding need among anglers for a new fish stringer apparatus that approaches the task of stringing the fish onto a stringing device and then releasably securing the stringing device at a desired location, and the provision of such a construction is a stated objective of the present invention.

DISCLOSURE OF THE INVENTION

Briefly stated, the fish stringing apparatus that forms the basis of the present invention comprises a stringer unit and a releasable securing unit.

The stringer unit comprises a first cable member having looped ends which are operatively attached to opposite ends of a capture member. One looped end of the cable member is fixedly secured to one end of the capture member and the other looped end of the cable member is releasably engaged by the other end of the capture member.

In addition, the releasable securing unit comprises a second cable member operatively secured on one end to the stringer unit and having a free end that is adapted to releasably secure the apparatus at a desired location.

As will be explained in greater detail further on in the specification, the second cable member is elongated so that it may be tied off to a piling or cleat to secure the entire apparatus. The free end of the second cable member is also provided with a rigid elongated tip element that may be forced into penetrating engagement with the terrain, such as the bank of a lake, stream or river in close proximity to the angler.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the apparatus secured to a dock;

FIG. 2 is a perspective view of the apparatus engaged with a bank of land adjacent a body of water;

FIG. 3 is an isolated perspective view of the apparatus;

FIG. 4 is an enlarged detail view of the operative engagement of the components of the apparatus; and FIG. 5 is a detail view of the stringing function of the apparatus.

BEST MODE FOR CARRYING OUT THE INVENTION

As can be seen by reference to the drawings, and in particular to FIG. 3, the fish stringer apparatus that forms the basis of the present invention is designated generally by the reference numeral (10). The apparatus (10) comprises in general, a stringer unit (11) and a securing unit (12).

As shown in FIG. 3, the stringer unit (11) comprises a first elongated flexible cable member (13) having first and second looped ends (14, 15) formed by conventional clamp elements (16) and a capture member (17). The capture member (17) as shown in FIGS. 3 and 4 comprises a spring loaded snap fastener element (18) disposed on one end of the capture member (17) and a swivel element (20) disposed on the other end of the capture member (17). The snap fastener member (18) controls the opening (19) in the capture member in a well recognized fashion.

In addition, the first looped end (14) of the cable member (13) is fixedly secured to the swivel element (20) whereas, the second looped end (15) of the cable member is dimensioned to be releasably received in the opening (19) of the snap fastener element (18) in a well recognized fashion.

As can best be seen by reference to FIG. 3, the securing unit (12) comprises a second elongated cable member (30) having a coupling element (31) formed on the inboard end (32) for attachment to the stringer unit (11) and a rigid penetrating rod element (33) formed on the free end (34) whose purpose and function will be described presently.

Still referring to FIGS. 3 and 4, it can be seen that in the preferred embodiment, the coupling element (31) is pivotally secured to the first looped end (14) of the first cable member (13); however, it should also be appreciated that this invention also contemplates the pivotal securement of the coupling element (31) to the swivel element (20) of the capture member (17) in keeping with the teachings of this invention.

Turning now to FIGS. 1 and 5, it can be seen that the stringing function of the apparatus (10) is accomplished by threading the free looped end (15) of the first cable member (13) through one of the gills (101) and out the mouth (102) of a fish (100). Then the looped end (15) is captively engaged in the capture member (17) by retracting the spring loaded snap fastener (18) to allow the looped end (15) to pass into the opening (19) of the capture member (17) whereupon the snap fastener (18) is released to captively engage the looped end (15) within the capture member (17).

As shown in FIGS. 1 and 2, the securing unit (12) may be operatively attached to elevated stationary items (200) such as a piling (202) of a dock (201) by tying the second elongated cable member (30) around the piling (202) such that the stringer unit (11) will be submerged. In addition, when no elevated stationary items such as trees, docks, etc. are available, the securing unit (12) may be secured to the bank (301) of a body of water (300) such as a lake, stream, river, etc. by pushing the rod element (33) on the free end of the second cable member (30) into penetrating engagement with the soil of the bank (301) in close proximity to the waterline so that the stringer unit (11) will remain submerged.

By now it should be appreciated that even though we have been using the terminology cable to describe the elongated flexible member (13, 30), that for the purposes of this invention the terminology strings, strands, cords, ropes, etc. will fall with the scope of the term cables.

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

We claim:

1. A stringer apparatus for fish wherein the apparatus consists of:
 a stringer unit including a first elongated flexible cable member having first and second looped ends; and, a capture member having at one end thereof a swivel element captively secured to the first end of the cable member and at a second end thereof a releasable fastener releasably secured to the second end of the cable member; wherein, the releasable fastener includes an opening disposed on the said second end of the capture member wherein the opening is controlled by a snap fastener element; and,
 a securing unit including a second elongated cable member having one end operatively secured to the stringer unit; wherein, the securing unit further comprises:
 an elongated rigid rod element disposed on the other end of the second cable member; and, wherein the said one end of the second cable member is pivotally attached to the stringer unit by a coupling element.

* * * * *